US010439477B2

(12) United States Patent
Pinkley et al.

(10) Patent No.: US 10,439,477 B2
(45) Date of Patent: Oct. 8, 2019

(54) PRESSURIZED AND GRAVITY-FED LIQUID COOLING OF ELECTRIC MOTOR

(71) Applicant: Tesla Motors, Inc., Palo Alto, CA (US)

(72) Inventors: Gary A. Pinkley, Union City, CA (US); David F. Nelson, Menlo Park, CA (US); William R. Fong, Hayward, CA (US); Scott Heines, Palo Alto, CA (US); Edwin M. Pearce, Jr., San Francisco, CA (US)

(73) Assignee: Tesla, Inc., Palo Alto, CA (US)

( * ) Notice: Subject to any disclaimer, the term of this patent is extended or adjusted under 35 U.S.C. 154(b) by 498 days.

(21) Appl. No.: 14/170,050

(22) Filed: Jan. 31, 2014

(65) Prior Publication Data

US 2015/0222162 A1 Aug. 6, 2015

(51) Int. Cl.
| | |
|---|---|
| *H02K 9/00* | (2006.01) |
| *H02K 9/19* | (2006.01) |
| *H02K 9/193* | (2006.01) |
| *H02K 9/197* | (2006.01) |
| *H02K 7/116* | (2006.01) |
| *F16H 57/04* | (2010.01) |

(52) U.S. Cl.

CPC ............... *H02K 9/193* (2013.01); *H02K 9/00* (2013.01); *H02K 9/19* (2013.01); *H02K 9/197* (2013.01); *F16H 57/0412* (2013.01); *F16H 57/0441* (2013.01); *H02K 7/116* (2013.01)

(58) Field of Classification Search
CPC ............ H02K 9/00; H02K 9/19; H02K 9/193; H02K 9/197; H02K 7/116; F16H 57/0412; F16H 57/0436

USPC .......... 310/52, 54, 57, 58, 64; 10/52, 54, 57, 10/58, 64
See application file for complete search history.

(56) References Cited

U.S. PATENT DOCUMENTS 3,479,541 A * 11/1969 Robinson ................ H02K 9/20 310/54
3,648,085 A 3/1972 Fujii
5,418,400 A * 5/1995 Stockton ................ F02N 11/04 290/22

(Continued)

FOREIGN PATENT DOCUMENTS

JP 2004-180376 A 6/2004
JP 2013-031282 A 2/2013
WO WO 2015008390 A1 * 1/2015 .............. H02K 9/12

OTHER PUBLICATIONS

International search report and written opinion in application PCT/US2015/012667, dated Apr. 24, 2015, 10 pages.

*Primary Examiner* — Julio C. Gonzalez
*Assistant Examiner* — Alexander A Singh
(74) *Attorney, Agent, or Firm* — Garlick & Markison; Bruce E. Garlick; Harry S. Tyson, Jr.

(57) ABSTRACT

A liquid cooling system for an electric motor includes: a pump for liquid to cool the electric motor; a heat exchanger that removes heat from the liquid; a manifold extending above a stator of the electric motor, the manifold receiving the liquid under pressure and having a first opening that directs a first liquid jet onto the stator; and a first tray above first end turns of the stator, the manifold having a second opening that directs a second liquid jet onto the first tray, the first tray having a third opening that performs gravity-fed liquid distribution onto the first end turns.

13 Claims, 5 Drawing Sheets

(56) References Cited

U.S. PATENT DOCUMENTS

| | | | |
|---|---|---|---|
| 5,718,302 A * | 2/1998 | Hasebe | B60K 1/00 |
| | | | 180/60 |
| 7,009,317 B2 | 3/2006 | Cronin et al. | |
| 8,169,110 B2 | 5/2012 | Smales | |
| 8,456,046 B2 | 6/2013 | Bradfield | |
| 2007/0035187 A1 | 2/2007 | Verhaegen | |
| 2007/0273228 A1 | 11/2007 | Tanaka et al. | |
| 2010/0033040 A1 * | 2/2010 | Wakita | H02K 9/19 |
| | | | 310/54 |
| 2010/0045125 A1 * | 2/2010 | Takenaka | H02K 1/20 |
| | | | 310/54 |
| 2010/0077786 A1 | 4/2010 | Siegenthaler | |
| 2010/0163215 A1 | 7/2010 | Li et al. | |
| 2010/0284824 A1 | 11/2010 | Hippen et al. | |
| 2011/0084561 A1 * | 4/2011 | Swales | H02K 9/19 |
| | | | 310/54 |
| 2011/0156508 A1 | 6/2011 | Minemura | |
| 2011/0298315 A1 | 12/2011 | Fulton | |
| 2012/0062055 A1 | 3/2012 | Murakami et al. | |
| 2012/0091836 A1 * | 4/2012 | Hayashi | F16H 57/0412 |
| | | | 310/54 |
| 2012/0133222 A1 * | 5/2012 | Han | H02K 5/20 |
| | | | 310/58 |
| 2012/0175977 A1 | 7/2012 | Beatty et al. | |
| 2012/0273286 A1 | 11/2012 | Kim et al. | |
| 2013/0200737 A1 | 8/2013 | Karlsson et al. | |
| 2013/0209239 A1 | 8/2013 | Karlsson et al. | |
| 2013/0235527 A1 | 9/2013 | Wagner et al. | |
| 2013/0276727 A1 | 10/2013 | DiPaola et al. | |
| 2014/0217842 A1 * | 8/2014 | Kikuchi | H02K 9/19 |
| | | | 310/54 |
| 2016/0134177 A1 * | 5/2016 | Itoh | H02K 9/12 |
| | | | 105/59 |

* cited by examiner

PRESSURIZED AND GRAVITY-FED LIQUID COOLING OF ELECTRIC MOTOR

BACKGROUND

Electric motors and other electrical drive units are used in a variety of contexts. For example, some vehicles have one or more electric motors or used for propelling the vehicle. Such motor(s) can be the vehicle's sole traction mode, as in a pure electric vehicle, or it/they can be used in combination with another traction mode, such as in a hybrid vehicle.

Electric motors generate heat when operated. If the amount of generated heat is greater than what is naturally dissipated to the environment through the motor's housing or other exterior feature, some form of active cooling can be provided. The active cooling can be driven directly by the rotational energy of the motor, or by external power, such as electricity. Typically, the active cooling is applied to one or more heat-generating parts of the motor, and/or the heat-sensitive part(s), so that unsafe temperatures are avoided. In the case of the stator and rotor of an electric motor, they typically consist of complex surfaces and structures—rotating structures in the case of the rotor—all of which generate some amount of heat during operation.

SUMMARY

In one aspect, a liquid cooling system for an electric motor includes: a pump for liquid to cool the electric motor; a heat exchanger that removes heat from the liquid; a manifold extending above a stator of the electric motor, the manifold receiving the liquid under pressure and having a first opening that directs a first liquid jet onto the stator; and a first tray above first end turns of the stator, the manifold having a second opening that directs a second liquid jet onto the first tray, the first tray having a third opening that performs gravity-fed liquid distribution onto the first end turns.

Implementations can include any or all of the following features. The manifold further includes an extension that directs a third liquid jet onto a rotor of the electric motor, wherein the rotor redistributes the liquid onto an inside of the first end turns. The extension is positioned by the first tray, and the manifold further includes another extension that directs a fourth liquid jet onto the rotor, the other extension positioned at an opposite end of the rotor. The liquid cooling system further includes a second tray above second end turns opposite the first end turns, the manifold having a fourth opening that directs a third liquid jet onto the second tray, the second tray having a fifth opening that performs gravity-fed liquid distribution onto the second end turns. The manifold includes first and second parts joined together, and the first and second openings are formed by an edge notch in at least one of the first and second parts. The liquid is oil. The liquid cooling system is implemented in a vehicle, the electric motor is joined to a gearbox of the vehicle, and the oil lubricates gears of the gearbox. The pump is a mechanical pump driven by at least one of the gears. The pump is positioned inside the gearbox and draws the liquid from a sump at a bottom of the gearbox. The third opening is a drain port having a surface that slopes toward the end turns in a direction of the second liquid jet. The first tray further includes at least one flow director that divides the second liquid jet between the third opening and a fourth opening. The manifold has multiple first openings that direct multiple first liquid jets onto the stator. The heat exchanger is an intercooler and the pump drives the liquid into the intercooler and thereafter into the manifold.

DETAILED DESCRIPTION

This document describes examples of systems and techniques for providing cooling of an electric motor. A cooling system can direct coolant at critical motor parts both by way of a pressurized jet and by a gravity-feed approach to ensure that coolant is distributed in an effective way and to all relevant motor components. Such an approach can serve to keep the number of pressure-based distribution openings at a manageable level, for example by minimizing the number of such openings. This can allow distribution of oil (or another coolant) to all necessary places of the motor while still maintaining the opening sizes so as to avoid clogging and ensuring an easy manufacturing process, to name just a few examples.

Figure 1:
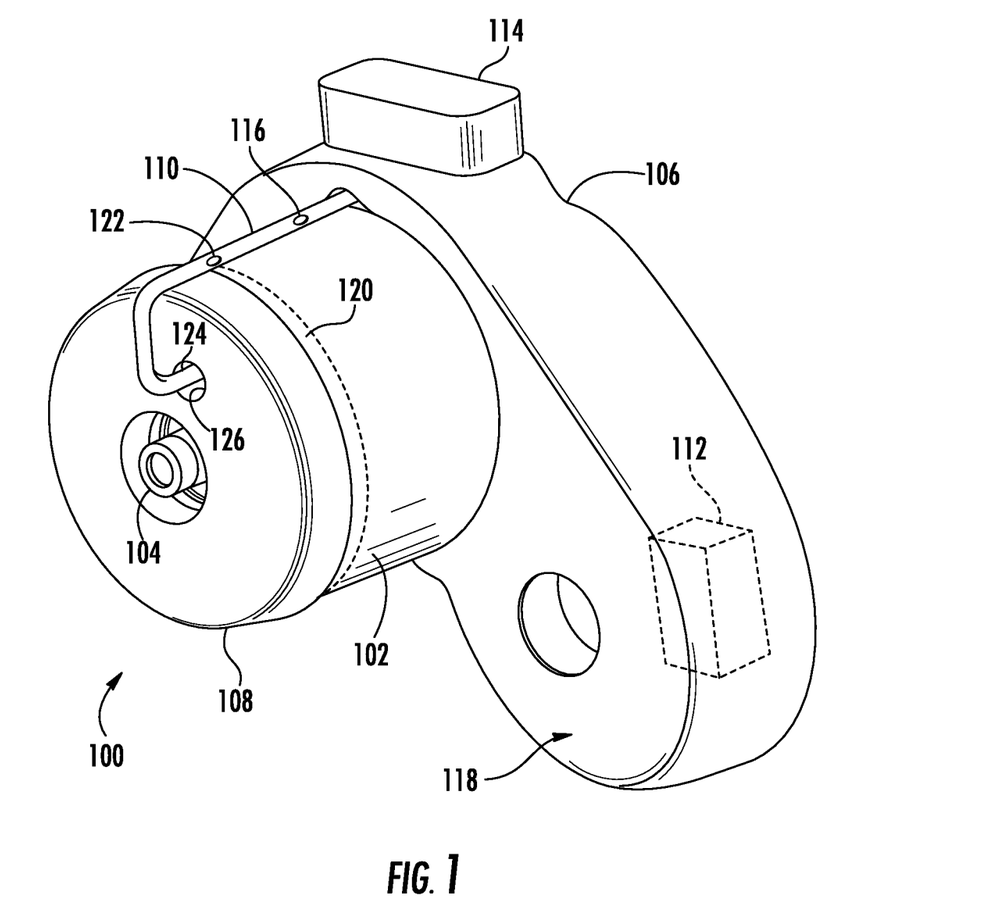
FIG. 1 shows an example of an electric motor provided with liquid cooling.

FIG. 1 shows an example of an electric motor 100 provided with liquid cooling. Generally, the motor has a stator 102 surrounding a rotor 104 (the shaft of which is visible in this example). The stator here has an endbell 108 with an opening for the shaft. The stator is here partially visible because a portion of a motor housing 106 has been omitted for clarity. That is, the space between the endbell and the housing is normally covered by the stator housing. The part of the stator that is currently visible is an outer surface formed by a stack of laminates.

Because the stator housing has here been omitted for clarity, however, an upper cooling pipe 110 of the cooling system is also visible. The motor 100 has a cooling system that serves to circulate coolant (i.e., a liquid, such as oil), by way of a pump 112 (here indicated as being inside the housing 106). That is, pressurized coolant is provided to an intercooler 114 (here indicated as being outside the housing) and from there onto the stator and rotor by way of the upper cooling pipe. The intercooler (or other heat exchanger) can remove heat from the circulating coolant by way of a secondary medium (e.g., water). An external water connection (not shown) can be provided to the intercooler, such as from the vehicle's main cooling system, or from a cooling system for a battery pack, to name just two examples.

The upper cooling pipe 110 has multiple features designed to provide effective cooling of all relevant motor components. First, one or more openings 116 can direct a jet of coolant at the laminate stack. That is, the coolant can be sprayed on the surface of the stator where it spreads out while pouring over the rounded surface. At the bottom of the stator housing, the coolant can collect and from there continue flowing toward a gearbox of the motor, ultimately ending up at a bottom 118 of the gearbox, which can act as a sump in the cooling system.

In addition to the laminate stack, the stator can have an endturn region 120 at each end, here schematically illustrated. That is, the stator can have conductor windings where current flows during operations, and the endturn region illustrated here represents where these windings make turns as they pass back and forth. The endturn regions can be significant heat generators in the motor, and the upper cooling pipe therefore has one or more openings 122 to provide coolant flow onto the endturns. The endturns can present an irregular surface, however, made up of many wires wound into a complex pattern. The opening 122 that serves the endturn region can therefore be part of a gravity-feed coolant distribution that is particularly suited to effectively cool these parts of the stator during operation. Examples of such coolant distribution will be described below.

The upper cooling pipe can also have at least one extension 124 aimed directly at the rotor. That is, the extension is here formed by the end of the cooling pipe that passes through an opening 126 in the endbell so as to direct a coolant jet at the operating rotor. This coolant can serve to cool both rotor and stator, in that some or all of the coolant that hits the revolving rotor can then be splashed onto the inside of the stator endturns.

That is, in the current example, a pressurized flow of coolant can be directed onto the motor by at least the opening 116 and the extension 124, whereas a gravity-feed distribution can be provided by at least the opening 122.

Figure 2:
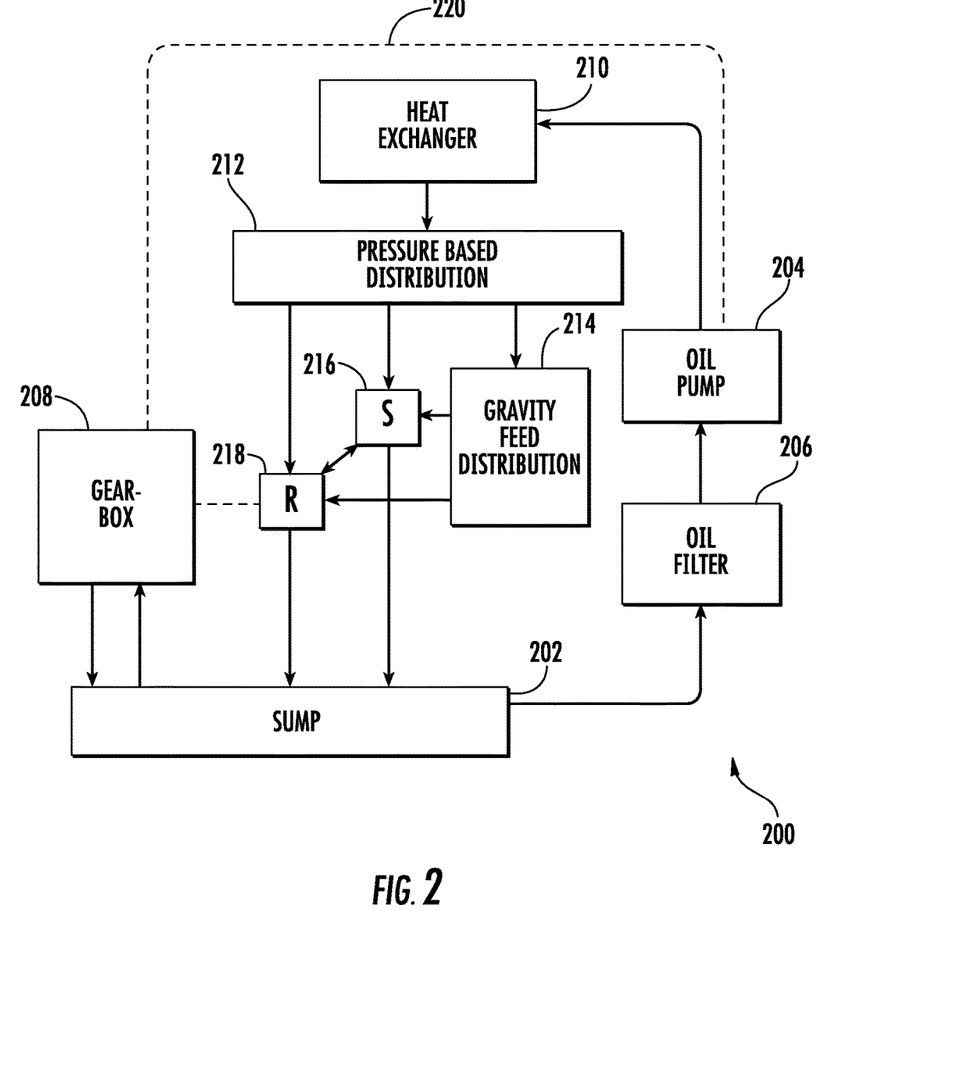
FIG. 2 schematically shows an example of a system that provides pressurized and gravity-fed liquid cooling of an electric motor.

FIG. 2 schematically shows an example of a system 200 that provides pressurized and gravity-fed liquid cooling of an electric motor. Some components of the electric motor 100 (FIG. 1) will be referenced for illustration only.

The lowest point of the system 200 is a here a sump 202, for example in the bottom 118 (FIG. 1) of the gearbox. The coolant, which in some implementations is an oil-based liquid, can gather in the sump due to gravity after it flows over the stator and/or the rotor. An oil pump 204 can draw the oil from the sump via an oil filter 206. The pump can be mechanically or electrically driven. For example, the pump can be mechanically driven at least in part by one or more gears of a gearbox 208 that is part of the electric motor, as schematically indicated by coupling 220. The oil pump can be mounted inside or outside the motor housing. The oil pump has at least one inlet in which it draws the coolant, and at least one outlet where it pumps out the coolant.

Here, the oil pump feeds the coolant into a heat exchanger 210, such as an intercooler. Heat is there removed so that the coolant has a lower temperature than when it entered the heat exchanger. The capacity that the heat exchanger needs to have depends on the amount of heat to be removed from the coolant, which in turn is a function of the amount of heat the motor is expected to generate, and how thermally sensitive the motor components are. In some implementations, more than one heat exchanger can be used. For example, multiple heat exchangers can be distributed in parallel or at different places in the circulation path of the coolant.

The heat exchanger feeds the coolant into at least one pressure based distribution component 212. From there, the coolant is fed into at least one gravity-feed distribution component 214. Each of these components can provide cooling of both a stator 216 and a rotor 218. For example, the pressure based distribution component can be positioned so that it directs one or more jets of coolant onto at least part of the stator and/or rotor. As another example, the gravity-feed distribution component can have a shape that corresponds to at least part of the stator or rotor, and one or more openings can be provided in the component so that coolant flows by way of gravity onto the part of the stator and/or rotor. The figure schematically illustrates (by a two-way arrow) that either or both of the rotor and stator can also serve to distribute some coolant onto the other. For example, this can include the rotor splashing coolant onto the stator (e.g., the endturns thereof), and/or coolant flowing from the stator onto the rotor (or a part thereof).

Coolant from the stator and the rotor collects in the sump 202. As mentioned, the sump can be provided in connection with the gearbox 208, for example at the lowest point thereof. Accordingly, the circulating coolant (e.g., oil) can serve to lubricate (or condition in some other way) one or more gears of the gearbox and this is schematically illustrated in the figure.

Figure 3:
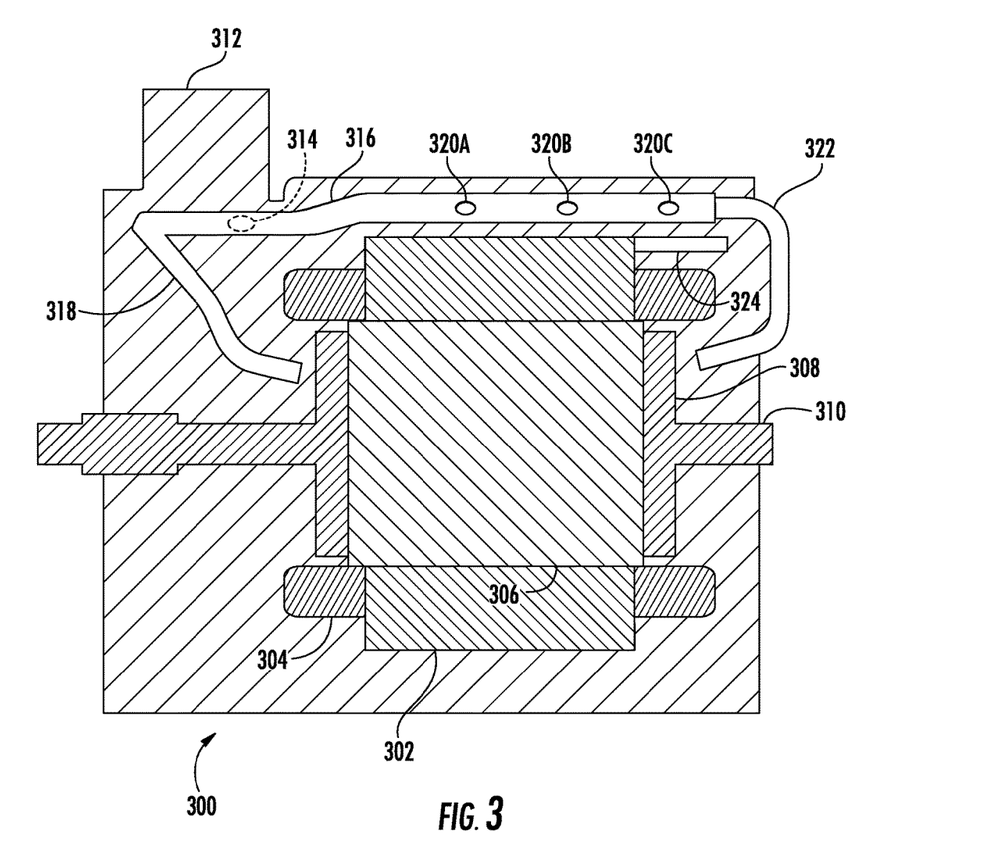
FIG. 3 shows an example cross section view of an electric motor.

FIG. 3 shows an example cross section view of an electric motor 300. In general, the motor has a stator 302 with endturns 304, and a rotor 306 with endrings 308, the rotor mounted on a shaft 310.

The motor has a heat exchanger 312 (e.g., an intercooler) which receives coolant through an inlet (not shown), such as from a pump, and provides coolant through at least one outlet 314 for cooling at least part of the motor. Directly connected to the outlet is a manifold 316 and at least one extension 318. The manifold here has openings 320A-C and leads to an extension 322. In this example, each of the openings 320A-B provides a coolant jet. For example, pressurized oil moving inside the manifold can spray out of these openings. The openings can be oriented so that the jets are directed at a portion of the stator, such as the outer surface of a laminate stack. More or fewer openings than the two openings 320A-B can be used for the laminate stack.

The opening 320C is part of a gravity-fed cooling feature for the stator endturns 304. Particularly, a tray 324 is positioned above the endturns, and this tray has one or more openings therein adapted to provide a flow of coolant onto selected portions of the endturns. That is, a coolant jet exits the manifold at the opening 320C and is directed at, or into, the tray, where the coolant flows, by way of gravity, through the one or more openings therein. Once the coolant hits the endturns it does not necessarily flow in a uniform direction due to their irregular shape. The tray can therefore ensure a good distribution of coolant over the endturns.

Each of the extensions 318 and 322 conveys pressurized coolant and directs a jet of coolant at a suitable portion of the motor. In this example, the extensions are aimed at the rotor endrings. That is, on each side of the rotor a jet of coolant will hit the rotor endring, or the rotor core, or both, during operation, in order to cool it/them. The rotation of the rotor can also ensure that coolant is directed onto some part of the stator, such as the endturn on either or both sides.

Systems that use both pressure-based and gravity driven distribution can have advantages over other approaches. For example, in a system that uses only pressure-based distribution—say, with ten or more openings—the openings would need to be relatively small and therefore prone to clogging. On the other hand, if such openings were made larger, then at low flow rates the coolant may not fill the distribution channel (e.g., a manifold) and the coolant would not reach some parts of the motor.

Figure 4:
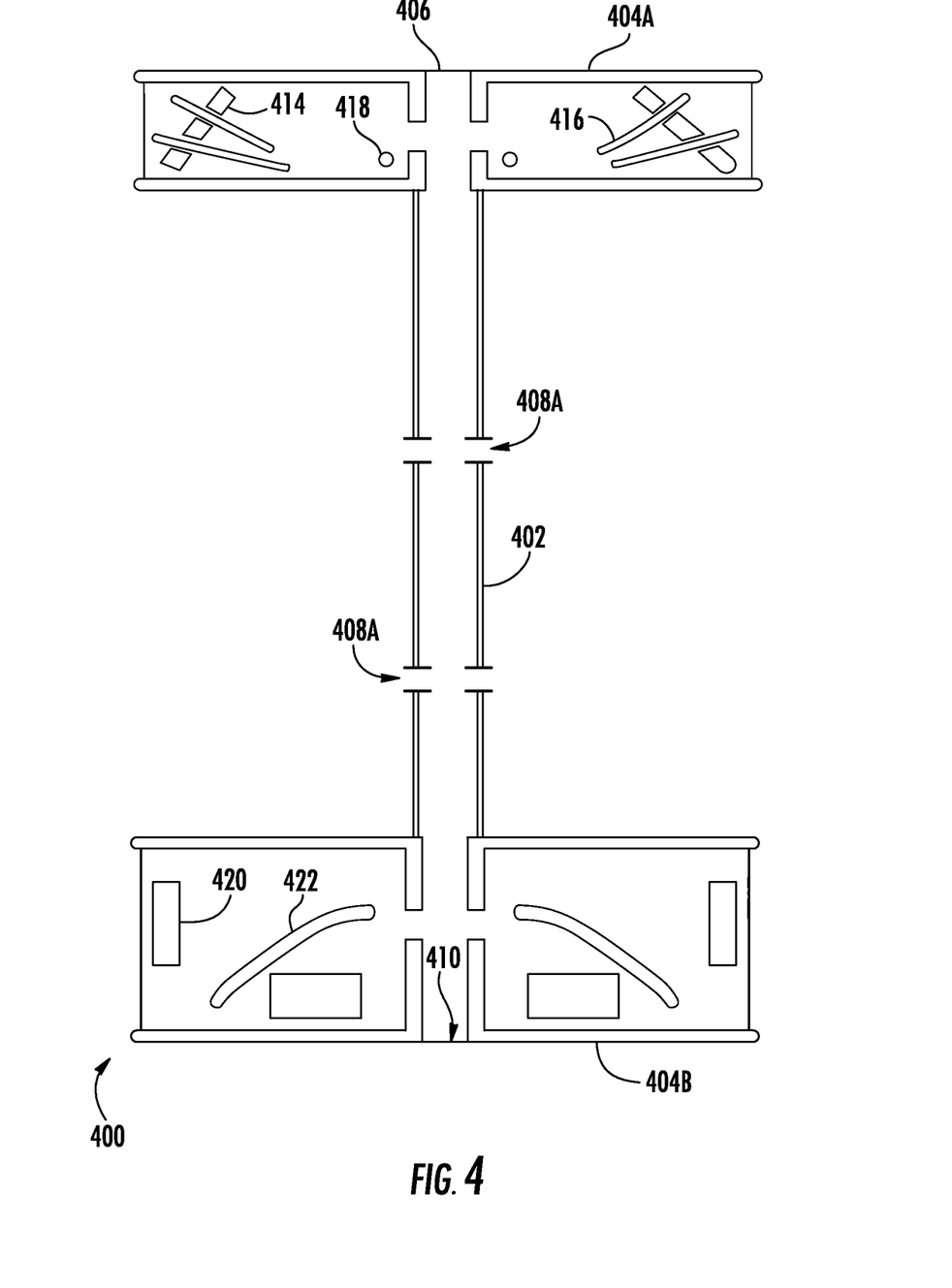
FIG. 4 shows an example of a cooling system that has a manifold and trays.

FIG. 4 shows an example of a cooling system 400 that has a manifold 402 and trays 404A-B. The top of the manifold has been omitted for clarity. In some implementations, this system is connected to the outlet of a heat exchanger and is positioned above a stator of the motor. That is, coolant will enter the cooling system 400 at an inlet 406 and exit at multiple places, including: into the tray 404A; through openings 408A-B; into the tray 408B; and through an outlet 410 at the end opposite the inlet. For example, the openings 408A-B can be pairwise oriented on both sides of the manifold.

One or more trays can have features for flow control. For example, the tray 404A here has six openings 414 through which the coolant flows down onto the structure beneath, such as the stator endturns. In some implementations, one or more openings can be shaped like a port, for example such that the bottom surface of the tray gradually slopes downward into the port, in the direction of coolant flow. The tray also has flow directors 416 (e.g., ridges) that serve to guide the flow of coolant inside the tray into one or more of the openings. The tray 404A can also have one or more ports 418 near the manifold that can create coolant flow on or near the top of the stator and/or the stator endturns. In this example, the tray 404A is generally perpendicular to the manifold and extends on both sides thereof, so that the stator endturns are fully coated with coolant.

Similarly, the tray 404B can have one or more openings, optionally with at least one flow director. For example, openings 420 (e.g., ports) and flow directors 422 are here illustrated.

The outlet 410 can be used to extend coolant distribution to another area of the motor. In some implementations, the extension 322 (FIG. 3) can be attached to the outlet. For example, this can provide a pressurized jet of coolant. For example, such jet can be directed toward the rotor or a part thereof.

Figure 5:
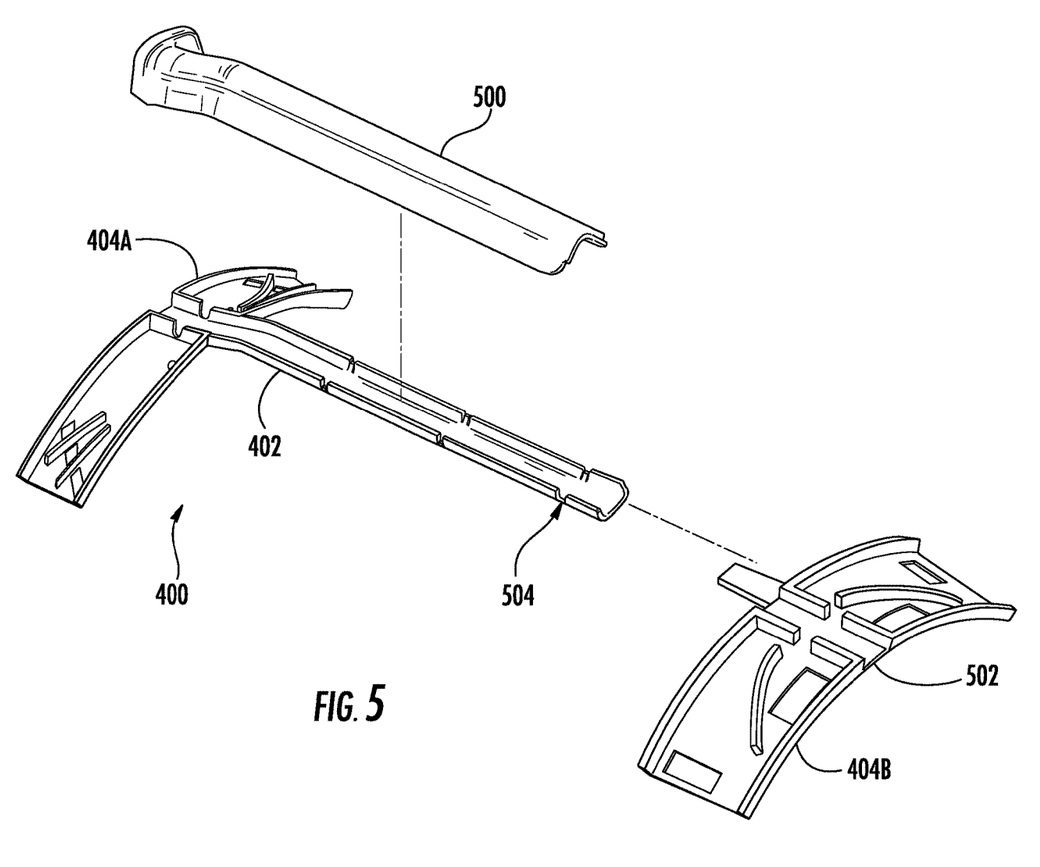
FIG. 5 shows another view of the cooling system in FIG. 4.

FIG. 5 shows another view of the cooling system 400 in FIG. 4. This example illustrates that the cooling system can be modular, which can be advantageous in terms of simplifying the manufacture and/or the assembly. For example, the manifold 402 and the tray 404A can be formed as one single integrated unit (e.g., in a molding process). A cap 500 can then be fitted on top of the manifold to form an enclosure for transporting the coolant. The manifold/tray unit can be joined to the tray 404B, such as by a friction-fit or using adhesive. For example, a portion of the tray 404B can form an opening 502 that at least partly encloses the manifold-and-cap structure and holds it in place. An end of the manifold, and the corresponding end of the cap 500, are configured to have an extension fitted thereon for providing pressurized coolant distribution to one or more additional parts of the motor.

The illustrated example shows that the tray 404A and/or 404B can have a shape that corresponds to some portion of the electric motor. For example, each of the trays is here curved so as to match the shape of the stator endturns. In other implementations, one or more of the trays can be planar, or can have another shape corresponding to a different motor component.

One or more openings 504 are formed in the combined manifold-cap structure. The opening(s) will provide one or more jets of coolant under pressure, for example as described above. In some implementations, the opening is formed by making a notch in one of the components along the edge where that component will be joined to the other component. For example, the manifold 402 can have one or more notches formed in its upper edge, and when the cap 500 is assembled onto the manifold, the notches form the openings configured for coolant flow. Such an approach can be simpler and less expensive than, say, drilling or otherwise machining the opening(s) into the component.

A number of implementations have been described as examples. Nevertheless, other implementations are covered by the following claims.

What is claimed is:

1. A liquid cooling system for an electric motor comprising:
   a pump for an oil to cool the electric motor;
   a heat exchanger that receives oil from the pump and removes heat from the oil;
   a manifold extending above a stator of the electric motor, the manifold receiving the oil from the heat exchanger via an inlet of the manifold, the manifold having a first opening that directs a first jet of the oil directly onto a laminate stack of the stator;
   a first tray above first end turns of the stator, the manifold having a second opening that directs a second jet of the oil onto the first tray, the first tray having a third opening that performs gravity-fed distribution of the oil onto the first end turns; and
   the manifold further having a first extension that directs a third jet of the oil directly onto first endrings of a first end of a rotor of the electric motor, a portion of the first extension passing through an opening of a first endbell of the stator of the electric motor, wherein the rotor redistributes the oil from the third jet onto an inside of the first end turns.

2. The liquid cooling system of claim 1, wherein the manifold further comprises a second extension, located on an opposing side of the rotor from the first extension, that directs a fourth jet of the oil directly onto second endrings of a second end of the rotor of the electric motor, a portion of the second extension passing through an opening of a second endbell of the stator of the electric motor, wherein the rotor redistributes the oil from the fourth jet onto an inside of second end turns.

3. The liquid cooling system of claim 1, wherein an opening of the first extension providing the third jet of the oil is positioned beneath a portion of the first tray.

4. The liquid cooling system of claim 1, further comprising a second tray above second end turns opposite the first end turns, the manifold having a fourth opening that directs a fourth jet of the oil onto the second tray, the second tray having a fifth opening that performs gravity-fed distribution of the oil onto the second end turns.

5. The liquid cooling system of claim 1, wherein the manifold comprises first and second parts joined together, and wherein the first opening is formed by a first edge notch in at least one of the first and second parts and the second opening is formed by a second edge notch in at least one of the first and second parts.

6. The liquid cooling system of claim 1, wherein the heat exchanger utilizes a secondary liquid medium to remove heat from the oil.

7. The liquid cooling system of claim 6, implemented in a vehicle, wherein the electric motor is joined to a gearbox of the vehicle, and wherein the oil flows from the electric motor to the gearbox and the oil lubricates gears of the gearbox.

8. The liquid cooling system of claim 7, wherein the pump is a mechanical pump driven by at least one of the gears of the gearbox.

9. The liquid cooling system of claim 7, wherein the pump is positioned inside the gearbox and draws the oil from a sump at a bottom of the gearbox.

10. The liquid cooling system of claim 1, wherein the third opening is a drain port formed in a surface of the first tray that slopes toward the first end turns in a direction of the second jet of the oil.

11. The liquid cooling system of claim 1, wherein the first tray further comprises at least one flow director that divides the second jet of the oil between the third opening and a fourth opening.

12. The liquid cooling system of claim 1, wherein the manifold has multiple first openings that direct multiple first jets of the oil onto the stator.

13. The liquid cooling system of claim 1, wherein the heat exchanger is an intercooler and wherein the pump drives the oil into the intercooler and thereafter into the manifold.

* * * * *